US 6,590,853 B1

(12) United States Patent
Lee et al.

(10) Patent No.: US 6,590,853 B1
(45) Date of Patent: Jul. 8, 2003

(54) SWING ARM DRIVING TYPE OPTICAL RECORDING/REPRODUCING APPARATUS

(75) Inventors: Yong-hoon Lee, Suwon (KR); Chul-woo Lee, Sungnam (KR); Chong-sam Chung, Sungnam (KR); Kun-ho Cho, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/281,230

(22) Filed: Mar. 30, 1999

Related U.S. Application Data
(60) Provisional application No. 60/079,806, filed on Mar. 30, 1998.

(30) Foreign Application Priority Data

Mar. 30, 1998 (KR) .......................................... 1998-11070

(51) Int. Cl.[7] .............................. G11B 7/085; G11B 7/12
(52) U.S. Cl. ..................................... 369/222; 369/44.19
(58) Field of Search ........................... 369/44.14, 44.17, 369/44.19, 215, 219, 222, 112, 300, 13, 13.11, 13.12, 13.13, 13.24, 13.32, 13.33, 13.34; 360/264.1, 264.3, 265.2, 265.4, 265.5, 265.6

(56) References Cited

U.S. PATENT DOCUMENTS

| 4,004,081 A | * | 1/1977 | Zorn ....................... 369/44.19 |
| 4,626,679 A | | 12/1986 | Kuwayama et al. ........ 250/227 |
| 4,794,586 A | * | 12/1988 | Korth ......................... 369/215 |
| 4,864,118 A | * | 9/1989 | Opheij et al. ................ 369/111 |
| 5,153,870 A | * | 10/1992 | Lee et al. ................... 369/111 |

(List continued on next page.)

FOREIGN PATENT DOCUMENTS

| JP | 6-76307 | 3/1994 |
| JP | 11-126355 | 5/1999 |
| WO | WO 98/06095 | 2/1998 |
| WO | WO 98/09392 | 3/1998 |

Primary Examiner—David L. Ometz
(74) Attorney, Agent, or Firm—Staas & Halsey LLP

(57) ABSTRACT

A swing arm driving type optical recording/reproducing apparatus includes a base, at least one optical disk rotatably installed on the base, both sides of which are information recording surfaces and a plurality of optical pickups which are equal in number to the information recording surfaces so as to form light spots on the respective information recording surfaces of the optical disk. Each optical pickup includes a light source for irradiating light. The apparatus also includes optical path changing units respectively arranged on optical paths between the light sources and respective ones of the information recording surfaces for changing the traveling paths of the lights and objective lenses arranged between the optical path changing units and the respective information recording surfaces for condensing incident light on the respective information recording surfaces. Photodetectors receive the lights reflected from the respective information recording surfaces and incident via the respective objective lenses and the optical path changing units. A swing member includes a mount on which the light sources, the optical path changing units and the photodetectors are installed. A plurality of swing arms extend from the mount. A suspension has one end which is installed on a surface of each swing arm and is adjacent to the respective information recording surface for elastically biasing the other end. A slider is installed at the other end of the suspension, which contacts the respective information recording surface by the elastic bias of the suspension and into which the respective objective lens is loaded. A supporting unit is interposed between the base and the mount for supporting the swing member to be reciprocally rotatable centering around one hinge point on the base and a magnetic driver for reciprocally rotating the swing member.

23 Claims, 5 Drawing Sheets

U.S. PATENT DOCUMENTS

| | | | |
|---|---|---|---|
| 5,432,763 A | 7/1995 | Campbell et al. | 369/44.19 |
| 5,631,893 A | 5/1997 | Kang et al. | 369/126 |
| 5,754,372 A * | 5/1998 | Ramsdell et al. | 360/265.6 |
| 5,828,482 A * | 10/1998 | Jain | 359/211 |
| 5,864,441 A * | 1/1999 | Coffey et al. | 360/97.01 |
| 6,052,357 A * | 4/2000 | Ogawa et al. | 369/215 |
| 6,111,840 A * | 8/2000 | Hajjar | 369/112 |
| 6,307,832 B1 * | 10/2001 | Novotny et al. | 369/13.33 |

* cited by examiner

SWING ARM DRIVING TYPE OPTICAL RECORDING/REPRODUCING APPARATUS

CROSS-REFERENCE TO RELATED APPLICATIONS

This application claims the benefit of Korean Application No. 98-11070, filed Mar. 30, 1998, in the Korean Patent Office and U.S. Provisional Application No. 60/079,806, filed Mar. 30, 1998, the disclosures of which are incorporated herein by reference.

BACKGROUND OF THE INVENTION

1. Field of the Invention

The present invention relates to an optical recording/reproducing apparatus for recording information and reproducing information from an optical recording medium and, more particularly, to a swing arm driving type optical recording/reproducing apparatus.

2. Description of the Related Art

In general, an optical recording/reproducing apparatus employs an optical disk on which information can be recorded on both sides or a plurality of optical disks separated from each other and having centers of rotation located on the same axis as each other, in order to increase the storage capacity thereof. Information is recorded and reproduced using an optical pickup. The optical recording/reproducing apparatus is divided into a carrier driving type and a swing arm driving type depending on the driving type.

In the carrier driving type, the optical pickup is installed on a base to be capable of directly transmitting an optical beam. The optical pickup is moved along a radial direction of the optical disk by a predetermined driving means.

In the swing arm driving type, an optical spot formed on the optical disk is transmitted by the optical pickup using the rotation of the swing arm rotatably installed on the base. The swing arm driving type has an advantage over the carrier driving type of reducing the access time by determining the position of the optical spot focused on the optical disk by the rotation of the swing arm centering around one hinge point. Meanwhile, in the swing arm driving type, most optical elements of the optical pickup are fixedly arranged on the base and optical elements, such as the objective lens for condensing light on the information recording surface, are arranged on the swing arm. Accordingly, the structure and assembly of the optical recording/reproducing apparatus is complicated and the optical path is designed to be long. Therefore, the swing arm driving type has a problem in that optical loss increases.

SUMMARY OF THE INVENTION

It is an objective of the present invention to provide a swing arm driving type optical recording/reproducing apparatus in which the number of optical parts is reduced by installing all optical elements of an optical pickup on a swing member and a supporting structure is improved so that the swing member easily locks to and releases from a base.

Additional objects and advantages of the invention will be set forth in part in the description which follows and, in part, will be obvious from the description, or may be learned by practice of the invention.

Accordingly, to achieve the above and other objects of the present invention, there is provided an optical recording/reproducing apparatus, comprising a base, at least one optical disk rotatably installed on the base, both sides of which are information recording surfaces, a plurality of optical pickups, each including a light source for irradiating light, optical path changing means arranged on an optical path between the light source and each information recording surface for changing the traveling path of light, an objective lens arranged between the optical path changing means and a respective one of the information recording surfaces for condensing incident light on the respective information recording surface and a photodetector for receiving the light reflected from the respective information recording surface and incident via the objective lens and the optical path changing means, a swing member including a mount on which the light sources, optical path changing means and the photodetectors are installed, a plurality of swing arms extended from the mount, a suspension, one end of which is installed on a surface of each swing arm which faces the respective information recording surface, for elastically biasing the other end and a slider which is installed at the other end of the suspension, which contacts the respective information recording surface by the elastic bias of the suspension and into which the respective objective lens is loaded, supporting means interposed between the base and the mount for supporting the swing member to be reciprocally rotatable centering around one hinge point on the base and magnetic driving means for reciprocally rotating the swing member.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
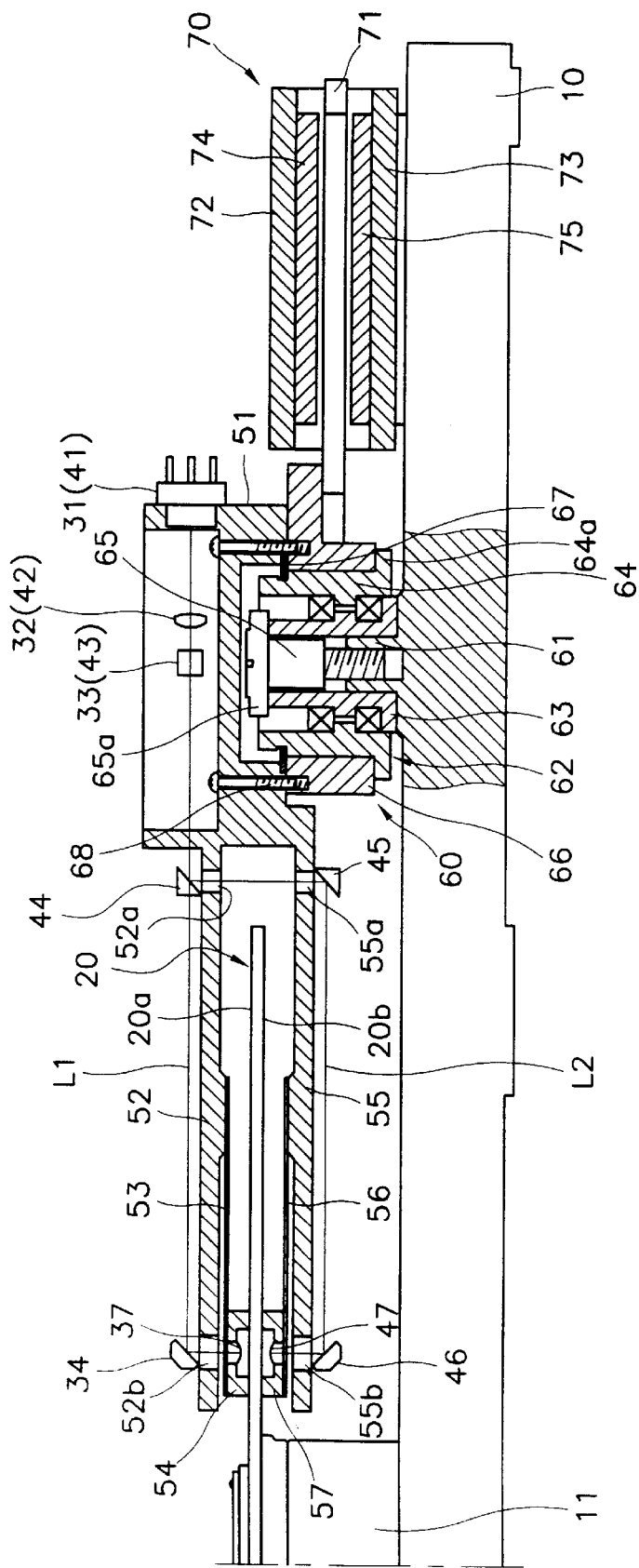
FIG. 1 is a vertical sectional view partially showing a swing arm driving type optical recording/reproducing apparatus according to a first embodiment of the present invention.
Figure 2:
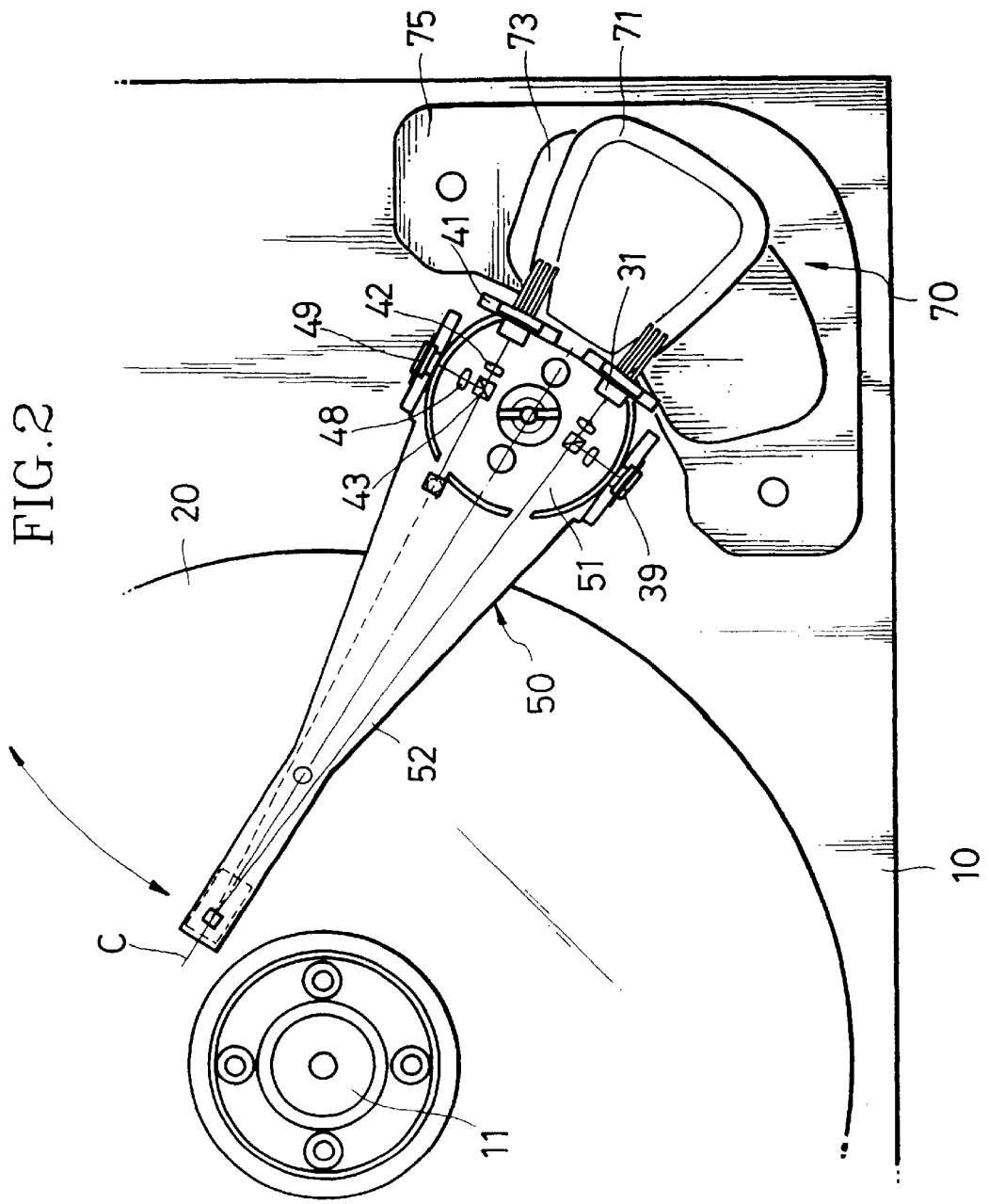
FIG. 2 is a plan view partially showing the swing arm driving type optical recording/reproducing apparatus according the first embodiment of the present invention.
Figure 3:
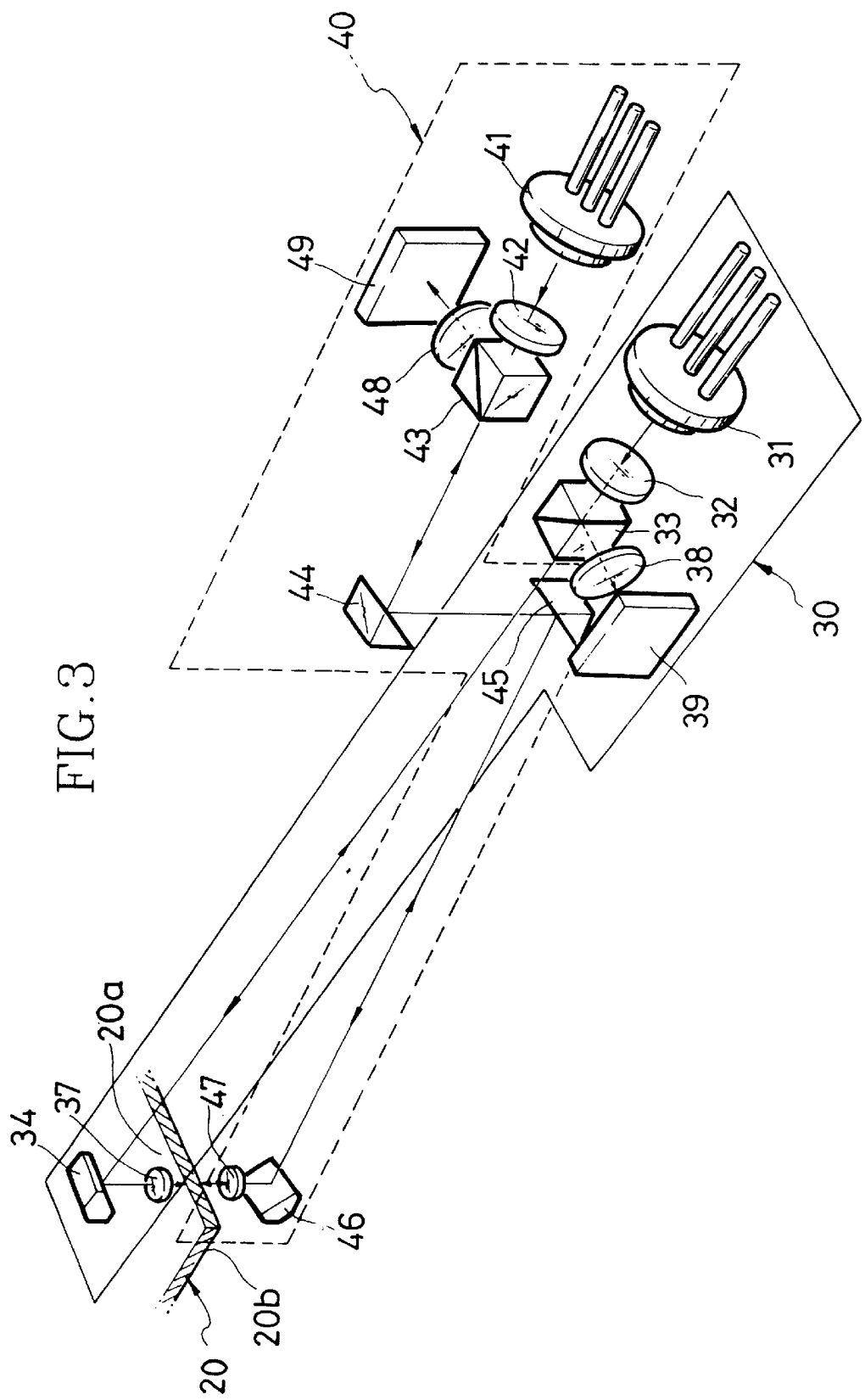
FIG. 3 is a perspective view showing the optical arrangement of an optical pickup of the swing arm driving type optical recording/reproducing apparatus according to the first embodiment of the present invention.

Referring to FIGS. 1 through 3, an optical recording/reproducing apparatus according to a first embodiment of the present invention includes a base 10, an optical disk 20 rotatably installed on the base 10 and having information recording surfaces 20a and 20b at opposite sides thereof, an optical pickup unit for recording information on and reproducing information by irradiating light onto the information recording surfaces 20a and 20b, a swing member 50 on which the optical pickup unit is mounted, a supporting unit 60 for supporting the swing member 50 to be reciprocally rotatable and a magnetic driver 70 for driving the swing member 50.

The optical disk 20 is mounted onto a spindle motor 11 installed in the base 10 and rotates on the base 10.

The optical pickup unit includes first and second optical pickups 30 and 40 for recording information on and reproducing information from the information recording surfaces 20a and 20b, respectively.

The first optical pickup 30 includes a first light source 31 for irradiating a first light L1, a first optical path changing unit 33 arranged on an optical path between the first light source 31 and the optical disk 20 for changing the traveling path of an incident light, a first objective lens 37 for condensing the first light L1 to form a light spot on the information recording surface 20a and a first photodetector 39 for receiving the first light L1 incident via the first objective lens 37 and the first optical path changing unit 33 after being reflected by the information recording surface 20a. The first optical path changing unit 33 makes the first light L1 incident from the first light source 31 face the first objective lens 37 and the first light L1 incident from the first objective lens 37 face the first photodetector 39.

Preferably, the first optical pickup 30 further includes a first collimating lens 32 arranged on the optical path between the first light source 31 and the first optical path changing unit 33 for condensing and collimating a divergent light irradiated from the first light source 31 and a first condensing lens 38 arranged on an optical path between the first optical path changing unit 33 and the first photodetector 39 for condensing the incident light. Also, the first optical pickup 30 includes a first reflective mirror 34 arranged on an optical path between the first optical path changing unit 33 and the first objective lens 37 for changing the traveling path of the first light L1 so as to be vertically irradiated onto the information recording surface 20a.

The second optical pickup 40 includes a second light source 41 for irradiating second light L2, a second optical path changing unit 43 arranged on an optical path between the second light source 41 and the optical disk 20 for changing the traveling path of the incident light, a second objective lens 47 for condensing the second light L2 so as to form a light spot on the information recording surface 20b of the optical disk 20 and a second photodetector 49 for receiving the second light L2 incident via the second objective lens 47 and the second optical path changing unit 43 after being reflected by the information recording surface 20b.

Preferably, the second optical pickup 40 further includes a second collimating lens 42 arranged on the optical path between the second light source 41 and the second optical path changing unit 43 for condensing and collimating the divergent light irradiated from the second light source 41 and a second condensing lens 48 arranged on an optical path between the second optical path changing unit 43 and the second photodetector 49 for condensing the incident light.

Here, the first and second light sources 31 and 41, the first and second optical path changing units 33 and 43 and the first and second photodetectors 39 and 49 are installed on the same plane. The first and second objective lenses 37 and 47 are arranged adjacent to the information recording surfaces 20a and 20b, respectively. Considering the above, second, third and fourth reflective mirrors 44, 45 and 46 are arranged on an optical path between the second optical path changing unit 43 and the second objective lens 47, so as to change the traveling path of the second light L2 to be irradiated at a right angle onto the information recording surface 20b.

In this embodiment of the present invention, a cubic type beam splitter is used as the first and second optical path changing units 33 and 43. However, a sheet type beam splitter, a polarized beam splitter and a holographic optical element (HOE) can be used as the first and second optical path changing units 33 and 43. Particularly, when the HOE is used, each of the first light source 31 and the first photodetector 39 and the second light source 41 and the second photodetector 49 can be integrated into one module.

The swing member 50 includes a mount 51 installed on the supporting unit 60 and a pair of first and second swing arms 52 and 55 extended from the mount 51 and protrusively formed to be placed on both sides of the optical disk 20.

The mount 51 is locked to the supporting unit 60. Most optical elements of the first and second optical pickups 30 and 40 are installed on the mount 51. For example, the light sources 31 and 41, the collimating lenses 32 and 42, the optical path changing units 33 and 43, the condensing lenses 38 and 48 and the photodetectors 39 and 49 are installed on the mount 51.

Here, in order to minimize the load on the mount 51 caused by the arrangement of the optical pickups 30 and 40 and the deterioration of resonance characteristics caused by rotation inertia, it is preferable that the optical pickups 30 and 40 are installed to be symmetrical with respect to the rotation center of the mount 51 and a center line C of the first and second swing arms 52 and 55.

The first and second swing arms 52 and 55 are formed to be extended from the mount 51 to face the information recording surfaces 20a and 20b, respectively. The first reflective mirror 34 is installed on the first swing arm 52 and the second through fourth reflective mirrors 44, 45 and 46 are installed on the second swing arm 55. The first and second swing arms 52 and 55 have light transmission holes 52a, 52b, 55a and 55b through which the first and second lights L1 and L2, whose paths are changed by the first through fourth reflective mirrors 34, 44, 45 and 46, pass. Also, first and second suspensions 53 and 56 for installing the first and second objective lenses 37 and 47 and first and second sliders 54 and 57 are installed on the first and second swing arms 52 and 55.

The first suspension 53, which is a plate spring having a predetermined elastic force, is coupled with one side of the first swing arm 52. The first slider 54 installed at the end of the first suspension 53 contacts the information recording surface 20a due to an elastic force of the first suspension 53. Also, the first objective lens 37, separated a predetermined distance from the information recording surface 20a, is loaded into the first slider 54. That is, since the first slider 54 contacts the information recording surface 20a by the first suspension 53, the first objective lens 37 is separated a uniform distance from the information recording surface 20a.

The second suspension 56 is coupled with one surface of the second swing arm 55, i.e., the surface which faces the information recording surface 20b. The second slider 57 is installed at the end of the second suspension 56. The second slider 57 contacts the information recording surface 20b by the second suspension 56. The second objective lens 47 is installed on the second slider 57.

The supporting unit 60, interposed between the base 10 and the mount 51, supports the swing member 50 to be reciprocally rotatable centering around one hinge point on the base 10. For this, the supporting unit 60 includes a supporting protrusion 61 formed in the base and having a screw groove inside, a pivot bearing 62 installed on the supporting protrusion 61 and a supporting body 66 inserted into the outer wheel 64 of the pivot bearing 62, to which the mount 51 and a coil member 71 of the following magnetic driving unit 70 is locked.

The pivot bearing 62 has an inner wheel 63 and an outer wheel 64. The inside of the inner wheel 63 is combined with the outer circumference of the supporting protrusion 61. A flange 64a is formed at a lower portion of the outer wheel 64 to control the downward movement of the supporting body 66. The pivot bearing 62 is installed at the outer circumference of the supporting protrusion 61 by locking a pivot screw 65 having a flange 65a on the top for controlling the upward movement of the pivot screw 65 to the supporting protrusion 61. The supporting body 66 is inserted into the outer circumference of the outer wheel 64. The downward movement of the supporting body 66 is controlled by a flange 64a. The upward movement of the supporting body 66 is controlled by a retainer ring 67 coupled with the upper end of the outer wheel 64.

The swing member 50 is combined with the supporting body 66 by a locking unit 68 such as a screw.

The magnetic driving. unit 70 installed to extend from the supporting unit 60 to the base 10 provides the swing member 50 a reciprocal rotation driving force. For this, the magnetic driving unit 70 includes the coil member 71 installed on the supporting unit 60 to reciprocally rotate together with the swing member 50, yoke members 72 and 73 installed on the base 10 and located at the outer upper and lower portions of the coil member 71 and magnets 74 and 75 installed on the yoke members 72 and 73 so as to face the coil member 71. Thus, the magnetic driving unit 70 rotates the swing member 50 by a mutual electromagnetic force with the magnets 74 and 75, changed by controlling the intensity and direction of current applied to the coil member 71.

Figure 4:
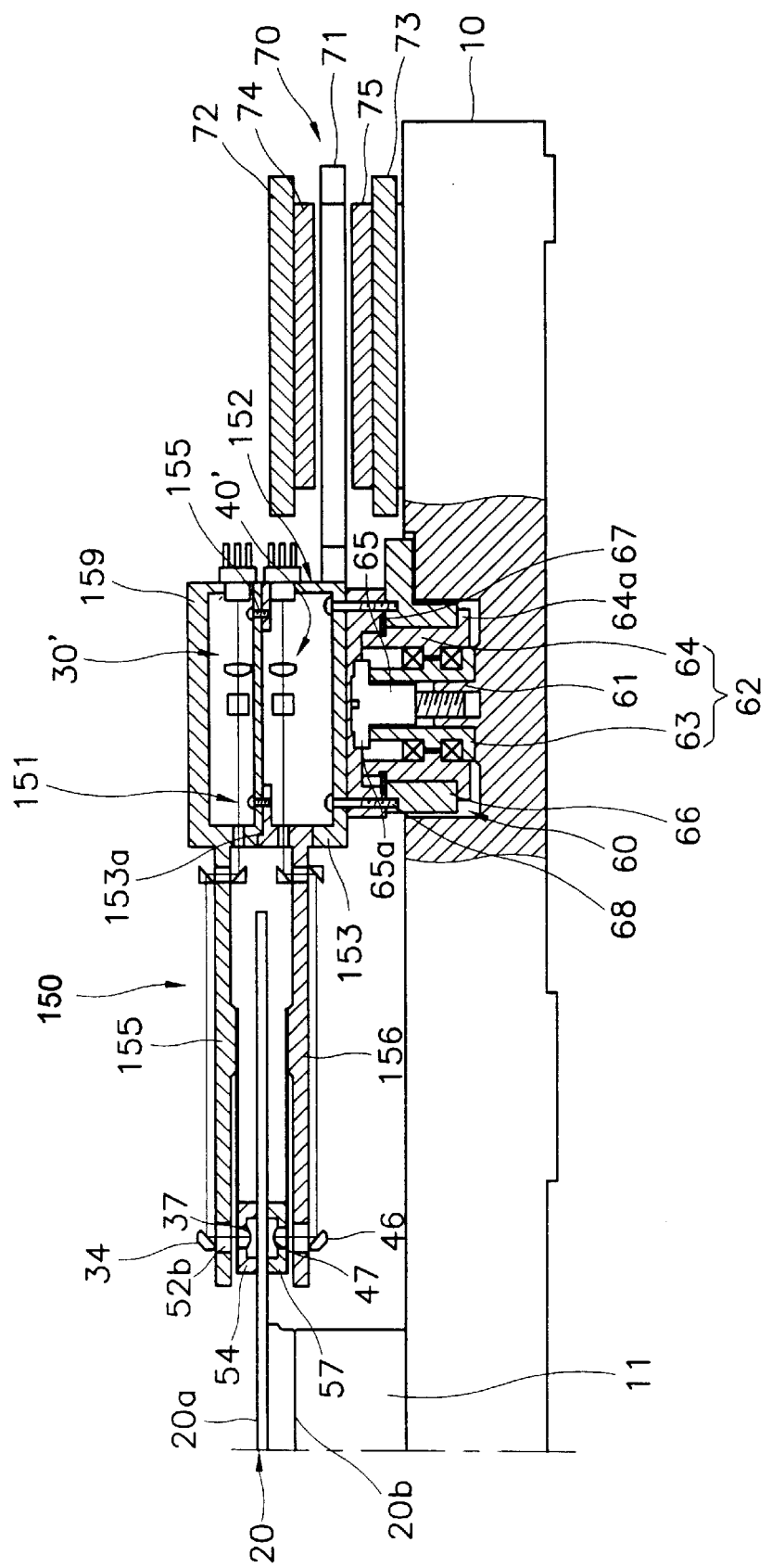
FIG. 4 is a sectional view partially showing a swing arm driving type optical recording/reproducing apparatus according to a second embodiment of the present invention.

Referring to FIG. 4, an optical recording/reproducing apparatus according to a second embodiment of the present invention, like the optical recording/reproducing apparatus according to the first embodiment, includes a base 10, an optical disk 20 which is rotatably installed on the base 10 and has information recording surfaces 20a and 20b at both sides thereof, optical pickups 30' and 40' for recording and reproducing information by irradiating light onto the information recording surfaces 20a and 20b, respectively, a swing member 150, onto which the optical pickups 30' and 40' are mounted, a supporting unit 60 for supporting the swing member 150 to be reciprocally rotatable and a magnetic driving unit 70 for driving the swing member 150. The structure of the swing member 150 and the optical arrangement of the optical pickup of the optical recording/reproducing apparatus of the second embodiment is different from the optical recording/reproducing apparatus of the first embodiment.

Here, since elements having the same reference numerals as those of the first embodiment have similar or the same functions as those of the first embodiment, detailed explanation thereof will be omitted.

The swing member 150 includes first and second mounts 151 and 152 and first and second swing arms 155 and 156. The second mount 152 is installed on the supporting unit 60. The second swing arm 156 is extended from the second mount 152 and is formed to be protrusive so as to be located on the information recording surface 20b of the optical disk 20. The first mount 151 is combined with the second mount 152. The first swing arm 155 is formed to be extended from the first mount 151 and is formed to be protrusive so as to be located adjacent to the information recording surface 20a. Some elements of the first and second optical pickups 30' and 40' are installed on the first and second mounts 151 and 152, respectively. The second mount 152 includes a spacer 153 which encloses most elements of the second optical pickup 40' and which has a step 153a in the upper portion thereof so as to easily install the first mount 151 on the second mount 152 with the installation space of the second optical pickup 40' secured. One side of a bottom of the first mount 151 is put on the step 153a of the spacer 153 and is locked to the second mount 152 by a general locking unit 158. The first mount 151 is surrounded by a cover 159 so as to protect the first optical pickup 30' installed therein.

The optical recording/reproducing apparatus having the above structure can be applied to two or more optical disks 20, which are arranged on the same axis and separated from each other by a predetermined interval. The optical recording/reproducing apparatus can be easily installed by including more than one swing member 150 illustrated with reference to FIG. 4 equal in number to the number of optical disks 20, sequentially stacking the swing members 150 in a vertical direction and then locking the swing members 150 to each other.

Figure 5:
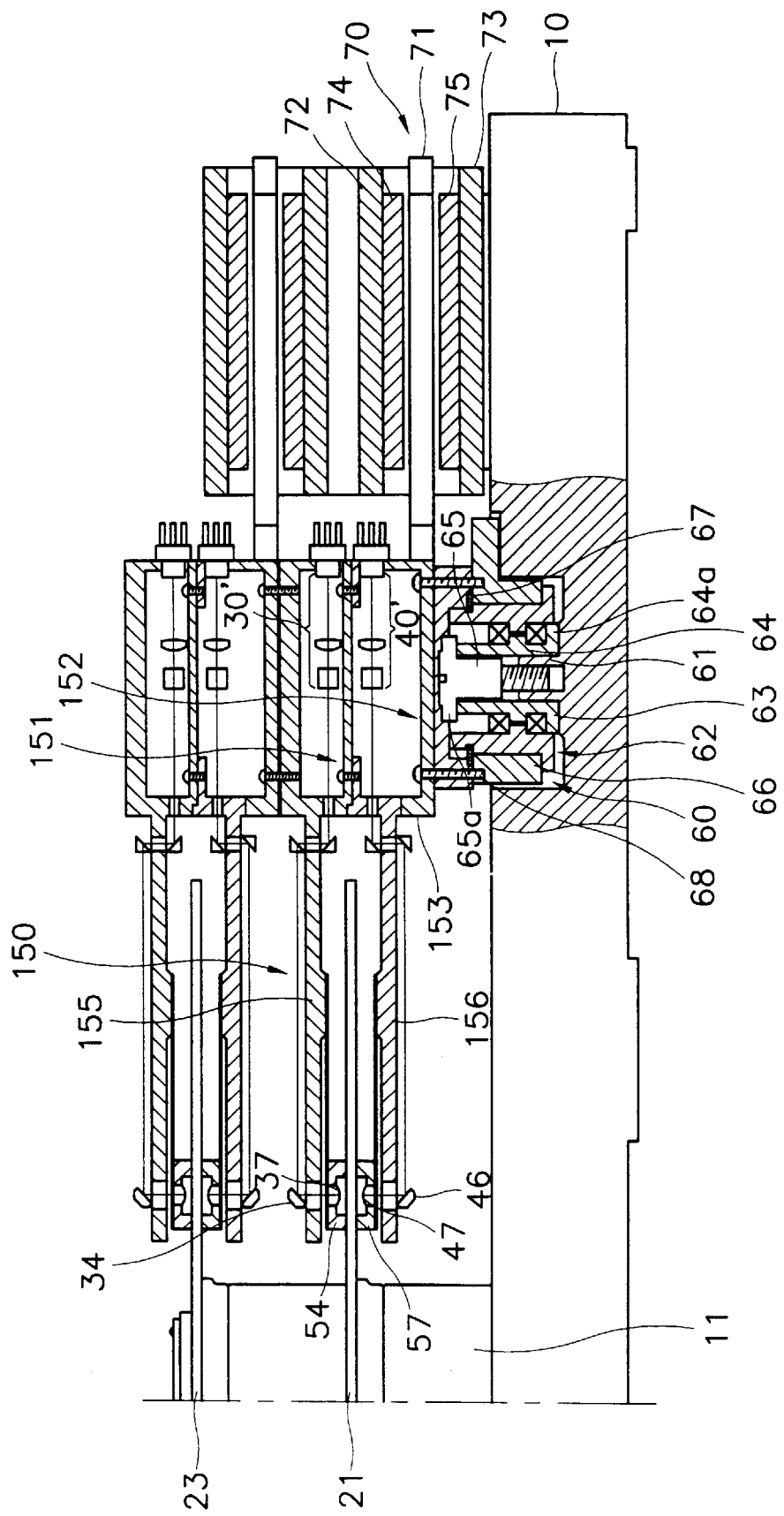
FIG. 5 is a sectional view partially showing a swing arm driving type optical recording/reproducing apparatus according to a third embodiment of the present invention.

FIG. 5 shows an example of the case where two optical disks 21 and 23 are adopted. As shown in FIG. 5, the optical recording/reproducing apparatus can be easily installed by including two swing members 150 each including first and second mounts 151 and 152 and first and second swing arms 155 and 156, and arranging the swing members 150 to be located adjacent to the information recording surfaces of the optical disks 21 and 23 and then locking the swing members 150 to each other.

Here, in order to increase the magnetic driving force by the magnetic driving unit 70, the magnetic driving units illustrated with reference to FIGS. 2 through 4 can be paired.

As described above, the optical recording/reproducing apparatus according to the present invention provides the following effects.

First, it is possible to minimize deterioration of resonance characteristics by rotation inertia by symmetrically arranging the optical elements on the swing member centering around the rotating center.

Second, it is possible to reduce access and tracking times required for changing the information recording surfaces compared with the plural optical disk recording/reproducing method using one light source and light receiving device by including the optical pickups having light sources corresponding to the respective information recording surfaces.

Third, plural optical disks can be simultaneously formatted.

Fourth, it is possible to prevent a delay in the access time caused by an increase in the load applied to the supporting unit since the driving force of the magnetic driving unit can be easily increased when a plurality of optical disks are stacked.

Fifth, since the optical pickup is installed on the swing member and the optical path hardly changes during tracking, the optical axis tilts slightly. Whereas, in a separation type, some optical systems are fixed to the base.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A swing arm driving type optical recording/reproducing apparatus, comprising:

a base;

at least one optical disk rotatably installed on said base, said at least one optical disk having two sides which are information recording surfaces;

a plurality of optical pickups which are equal in number to the information recording surfaces, each of said plurality of optical pickups including
   a light source irradiating light,
   optical path changing means arranged on an optical path between the light source and each information recording surface for changing a traveling path of a light,
   an objective lens arranged between the optical path changing means and each information recording surface condensing incident light on each information recording surface, and
   a photodetector receiving the light reflected from each information recording surface and incident via the objective lens and the optical path changing means;

a slider;

a swing member including a mount on which the light sources, optical path changing means and the photodetectors are installed, said swing member having a plurality of swing arms extending from the mount, a suspension having a first end of installed on a surface of each swing arm which faces the respective information recording surface, the suspension elastically biasing a second end of the suspension and said slider, into which the respective objective lens is loaded, wherein the slider is installed at the first end of the suspension and makes contact with the respective information recording surface by an elastic bias of the suspension;

supporting means interposed between said base and the mount for supporting said swing member to be reciprocally rotatable centering around a hinge point on said base; and magnetic driving means for reciprocally rotating said swing member, wherein said supporting means comprises:
   a supporting protrusion formed on said base,
   a pivot bearing inserted into an outer circumference of said supporting protrusion and having an inner wheel and an outer wheel, the outer wheel freely rotatable against the inner wheel, and
   a supporting body inserted into the outer wheel of said pivot bearing and locked to the mount of said swing member.

2. The apparatus of claim 1, wherein the magnetic driving means comprises:
   a coil member installed in the swing member and/or the supporting means;
   yoke members installed in the base and located at outer upper and lower portions of the coil; and
   magnets installed in the yokes so as to face the coil member,
   wherein the swing member is rotated by the intensity and direction of current applied to the coil member and a mutual electromagnetic force with the magnets.

3. The apparatus of claim 1, wherein said magnetic driving means comprises:
   a coil member installed on at least one of said swing member and said supporting means;
   a plurality of yoke members installed on said base and located at outer upper and lower portions of said coil member; and
   a plurality of magnets installed on respective ones of said plurality of yoke members and facing said coil member,
   wherein said swing member is rotated by an intensity and direction of a current applied to said coil member and a mutual electromagnetic force with said plurality of magnets.

4. An optical recording/reproducing apparatus to record/reproduce information to or from an optical disk having a first information recording surface and a second information recording surface, comprising:
   a base;
   a swing member having a first end rotatably attached to said base and a second end adjacent to the optical disk; and
   an optical pickup unit comprising first and second optical pickups comprising first and second pluralities of optical elements, respectively, said optical pickup unit installed on said swing member,
   the swing member comprising:
      a mount at said first end to mount ones of said first and second pluralities of optical elements, and
      a first swing arm extending from the mount and terminating at said second end,
   wherein said first optical pickup includes a first light source to irradiate a first light, a first optical path changing unit arranged on an optical path between said first light source and the optical disk to change the traveling path of an incident light, a first objective lens to condense the first light to form a light spot on the first information recording surface and a first photodetector to receive the first light incident via said first objective lens and said first optical path changing unit after being reflected by the first information recording surface, said second optical pickup includes a second light source to irradiate a second light,
   a second optical path changing unit arranged on an optical path between said second light source and the optical disk to change a traveling path of an incident light, a second objective lens to condense the second light to form a light spot on the second information recording surface of the optical disk, and a second photodetector to receive the second light incident via said second objective lens and said second optical path changing unit after being reflected by the second information recording surface, and
   said first and second light sources, said first and second optical path changing units and said first and second photodetectors are installed on a same plane.

5. The apparatus claimed in claim 4, further comprising:
a spindle motor installed on said base, wherein the optical disk is mounted on said spindle motor.

6. The apparatus claimed in claim 4, wherein said first and second optical pickups respectively record information on and reproduce information from the first and second information recording surfaces.

7. The apparatus as claimed in claim 4, wherein said first optical path changing unit makes the first light incident from said first light source face said first objective lens and the first light incident from said first objective lens face said first photodetector.

8. The apparatus as claimed in claim 4, wherein said first optical pickup further comprises:
   a first collimating lens arranged on an optical path between said first light source and said first optical path changing unit to condense and collimate a divergent light irradiated from said first light source; and a first condensing lens arranged on an optical path between said first optical path changing unit and said first photodetector to condense the incident light.

9. The apparatus as claimed in claim 8, wherein said first optical pickup further comprises a first reflective mirror arranged on an optical path between said first optical path changing unit and said first objective lens to change the traveling path of the first light to vertically irradiate the first light onto the first information recording surface.

10. The apparatus as claimed in claim 4, wherein said second pickup further comprises:
   a second collimating lens arranged on an optical path between said second light source and said second optical path changing unit to condense and collimate a divergent light irradiated from said second light source; and
   a second condensing lens arranged on an optical path between said second optical path changing unit and said second photodetector to condense the incident light.

11. The apparatus as claimed in claim 4, wherein the same plane is parallel to the first and second information recording surfaces.

12. The apparatus as claimed in claim 4, further comprising:
   a supporting unit to support said swing member, and
   a second swing arm extending from said mount,
   wherein said mount is locked to said supporting unit and said first swing arm and said second swing arm are protrusively placeable on first and second sides of the optical disk.

13. The apparatus as claimed in claim 12, wherein said first optical pickup and said second optical pickup are symmetrically installed with respect to a rotation center of said mount and a center line of said first and second swing arms.

14. The apparatus as claimed in claim 12, wherein said first and second swing arms each have a plurality of transmission holes through which the respective first and second lights pass.

15. The apparatus as claimed in claim 12, further comprising:
   first and second suspensions to install said respective first and second objective lenses, said first and second suspensions installed on the respective first and second swing arms; and
   first and second sliders installed on said respective first and second suspensions.

16. The apparatus as claimed in claim 15, wherein
   said first suspension is a plate spring having a predetermined elastic force and is coupled with a first side of said first swing arm, and
   said first slider is installed at a first end of said first suspension and contacts the information recording surface due to the elastic force of said first suspension.

17. The apparatus as claimed in claim 4, wherein said swing member further comprises a second swing arm, the first and second swing arms having respective transmission holes to pass the second light from a first side of the optical disk to a second side of the optical disk, to enable irradiation of the second light on the second information recording surface.

18. An optical recording/reproducing apparatus to record/reproduce information to or from an optical disk having a first information recording surface and a second information recording surface, comprising:

a base;
a swing member having a first end rotatably attached to said base and a second end adjacent to the optical disk; and
an optical pickup unit having a plurality of optical elements, said optical pickup unit installed on said swing member, wherein
   said optical pickup unit comprises first and second optical pickups to respectively record information on and reproduce information from the first and second information recording surfaces, wherein
      said first optical pickup includes a first light source to irradiate a first light, a first optical path changing unit arranged on an optical path between said first light source and the optical disk to change the traveling path of an incident light, a first objective lens to condense the first light to form a light spot on the first information recording surface and a first photodetector to receive the first light incident via said first objective lens and said first optical path changing unit after being reflected by the first information recording surface, and
      said second optical pickup includes a second light source to irradiate a second light, a second optical path changing unit arranged on an optical path between said second light source and the optical disk to change a traveling path of an incident light, a second objective lens to condense the second light to form a light spot on the second information recording surface of the optical disk, and a second photodetector to receive the second light incident via said second objective lens and said second optical path changing unit after being reflected by the second information recording surface,
   a supporting unit to support said swing member, a mount locked to said supporting unit and first and second swing arms extended from said mount and protrusively placable on first and second sides of the optical disk, and
   said supporting unit further comprises a supporting protrusion formed on said base and having a screw groove inside, a pivot bearing installed on said supporting protrusion and a supporting body inserted into an outer wheel of said pivot bearing to which said mount is locked.

19. The apparatus as claimed in claim 18, further comprising a magnetic driving unit locked to said supporting body and extending from said supporting unit to said base to provide said swing member a reciprocal rotation driving force.

20. The apparatus as claimed in claim 19, wherein said magnetic driving unit comprises:
   a coil member installed on said supporting unit to reciprocally rotate together with said swing member;
   a plurality of yoke members installed on said base and located at outer upper and lower portions of said coil member; and
   a plurality of magnets installed on respective ones of said plurality of yoke members to face said coil member, wherein
      said magnetic driving unit rotates said swing member by a mutual electromagnetic force with said plurality of magnets which can be changed by controlling an intensity and direction of a current applied to said coil member.

21. An optical recording/reproducing apparatus to record/reproduce information to or from an optical disk having a first information recording surface and a second information recording surface, comprising:

a base;

a swing member having a first end rotatably attached to said base and a second end adjacent to the optical disk;

an optical pickup unit having a plurality of optical elements, said optical pickup unit installed on said swing member;

wherein said optical pickup unit comprises first and second optical pickups to respectively record information on and reproduce information from the first and second information recording surfaces, said first optical pickup includes a first light source to irradiate a first light, a first optical path changing unit arranged on an optical path between said first light source and the optical disk to change the traveling path of an incident light, a first objective lens to condense the first light to form a light spot on the first information recording surface and a first photodetector to receive the first light incident via said first objective lens and said first optical path changing unit after being reflected by the first information recording surface, and said second optical pickup includes a second light source to irradiate a second light, a second optical path changing unit arranged on an optical path between said second light source and the optical disk to change a traveling path of an incident light, a second objective lens to condense the second light to form a light spot on the second information recording surface of the optical disk, and a second photodetector to receive the second light incident via said second objective lens and said second optical path changing unit after being reflected by the second information recording surface; and second, third and fourth reflective mirrors arranged on an optical path between said second optical path changing unit and said second objective lens to change a traveling path of the second light so that the second light is irradiated at a right angle onto the second information recording surface.

22. An optical recording/reproducing apparatus to record/reproduce information to or from an optical disk having a first information recording surface and a second information recording surface, comprising:

a base;

first and second optical pickups to record and reproduce information by irradiating a light onto the first and second information recording surfaces;

a swing member into which said first and second optical pickups are symmetrically mounted about an axis of rotation of the swing member;

a supporting unit to reciprocally rotatably support said swing member, the supporting unit comprising a bearing disposed between said swing member and said base; and a magnetic driving unit to drive said swing member.

23. An optical recording/reproducing apparatus to record/reproduce information to or from an optical disk having a first information recording surface and a second information recording surface, comprising:

a base;

a swing member having a first end rotatably attached to said base about a rotation axis and a second end adjacent to the optical disk; and first and second optical pickups to respectively record information on and reproduce information from the first and second information recording surfaces, said first and second optical pickups installed on said swing member and each of said first and second optical pickups having a plurality of optical elements, wherein said first and second optical pickups are symmetrically installed with respect to the rotation axis of said swing member.

\* \* \* \* \*